US012774111B2

(12) United States Patent
Kisska et al.

(10) Patent No.: US 12,774,111 B2
(45) Date of Patent: Oct. 27, 2026

(54) TOP-FUSELAGE MOUNTED CRYOGENIC TANK

(71) Applicant: The Boeing Company, Arlington, VA (US)

(72) Inventors: Michael K. Kisska, Long Beach, CA (US); Esther Shifra Zidovetzki, Long Beach, CA (US); Drew Christopher Hoffman, Signal Hill, CA (US); Htet Htet N. OoMandzak, Long Beach, CA (US); Faith O'Brien, Long Beach, CA (US)

(73) Assignee: The Boeing Company, Arlington, VA (US)

( * ) Notice: Subject to any disclaimer, the term of this patent is extended or adjusted under 35 U.S.C. 154(b) by 54 days.

(21) Appl. No.: 18/747,556

(22) Filed: Jun. 19, 2024

(65) Prior Publication Data

US 2026/0028130 A1 Jan. 29, 2026

Related U.S. Application Data

(60) Provisional application No. 63/659,039, filed on Jun. 12, 2024.

(51) Int. Cl.
*B64D 37/04* (2006.01)
*B64D 37/30* (2006.01)
*B64D 37/32* (2006.01)

(52) U.S. Cl.
CPC ............. *B64D 37/04* (2013.01); *B64D 37/30* (2013.01); *B64D 37/32* (2013.01)

(58) Field of Classification Search
CPC ...... B64D 37/30; B64D 37/04; B64D 27/355; B64D 2041/005
See application file for complete search history.

(56) References Cited

U.S. PATENT DOCUMENTS

| | | | | |
|---|---|---|---|---|
| 2,465,095 A | | 3/1949 | Harvey | |
| 3,129,836 A | | 4/1964 | Frevel | |
| 5,429,268 A | | 7/1995 | Hale et al. | |
| 5,833,172 A | * | 11/1998 | Grafwallner | B64D 37/26 244/135 R |
| 7,624,946 B2 | * | 12/2009 | Schoene | F17C 1/00 244/172.3 |
| 7,871,042 B2 | * | 1/2011 | Velicki | B64D 37/06 244/135 R |
| 9,701,416 B2 | * | 7/2017 | Epstein | F02C 7/224 |

(Continued)

FOREIGN PATENT DOCUMENTS

| | | | | |
|---|---|---|---|---|
| CN | 118145008 A | * | 6/2024 | B64D 37/30 |
| CN | 222876281 U | * | 5/2025 | |

(Continued)

OTHER PUBLICATIONS

European Patent Office Extended Search Report, dated Aug. 27, 2025, regarding Application No. EP25170282.5, 6 pages.

(Continued)

*Primary Examiner* — Joshua J Michener
*Assistant Examiner* — Michael B. Kreiner
(74) *Attorney, Agent, or Firm* — Yee & Associates, P.C.

(57) ABSTRACT

A system and method for mounting a cryogenic tank on an aircraft. The system includes a tank support system connected to a crown region of a fuselage of an aircraft, a cryogenic tank connected to the tank support system, and a fairing encasing the tank support system and the cryogenic tank.

20 Claims, 12 Drawing Sheets

(56) References Cited

U.S. PATENT DOCUMENTS

| | | | | |
|---|---|---|---|---|
| 9,938,025 | B2 | 4/2018 | Faure et al. | |
| 11,453,483 | B2 * | 9/2022 | Page | B64C 25/14 |
| 11,807,383 | B2 * | 11/2023 | Dean | B64C 7/00 |
| 12,097,967 | B2 * | 9/2024 | Mertes | B64D 37/30 |
| 12,497,188 | B2 * | 12/2025 | Watts | B64D 27/34 |
| 2012/0217251 | A1 * | 8/2012 | Handa | B60K 15/07 220/586 |
| 2018/0163924 | A1 | 6/2018 | Cook | |
| 2023/0339593 | A1 * | 10/2023 | López-Herrero | B64C 1/10 |
| 2023/0415907 | A1 * | 12/2023 | Puschmann | B64D 29/08 |
| 2024/0116650 | A1 | 4/2024 | Metzner et al. | |
| 2024/0151358 | A1 * | 5/2024 | Minas | B64D 37/30 |
| 2024/0270401 | A1 * | 8/2024 | Kondo | B64D 37/04 |
| 2025/0020285 | A1 | 1/2025 | An | |

FOREIGN PATENT DOCUMENTS

| | | | | | |
|---|---|---|---|---|---|
| EP | 4029786 | A1 | | 7/2022 | |
| EP | 4029786 | B1 | * | 9/2025 | B64C 7/00 |
| FR | 3100798 | A1 | * | 3/2021 | B64D 37/30 |
| GB | 2591253 | A | * | 7/2021 | B64D 37/30 |
| GB | 2591255 | A | * | 7/2021 | B64C 1/0009 |
| KR | 20210014248 | A | | 2/2021 | |
| KR | 20210016174 | A | | 2/2021 | |
| WO | WO-2025132104 | A1 | * | 6/2025 | B64C 3/10 |

OTHER PUBLICATIONS

European Patent Office Extended Search Report, dated Oct. 8, 2025, regarding Application No. EP25179955.7, 6 pages.

Office Action, dated Oct. 21, 2025, regarding U.S. Appl. No. 18/747,546, 18 pages.

Luu et al., "Cryogenic Tank Support System," filed Jun. 19, 2024, U.S. Appl. No. 18/747,546, 42 pages.

Final Office Action, dated Jan. 12, 2026, regarding U.S. Appl. No. 18/747,546, 16 pages.

Notice of Allowance, dated Apr. 14, 2026, regarding U.S. Appl. No. 18/747,546, 15 pages.

* cited by examiner

TOP-FUSELAGE MOUNTED CRYOGENIC TANK

CROSS-REFERENCE TO RELATED APPLICATIONS

This application claims the benefit of U.S. Provisional Patent Application Ser. No. 63/659,039, filed Jun. 12, 2024, and entitled “Cryogenic Tank Support System,” which is incorporated herein by reference in its entirety.

This application is related to the following U.S. patent application: U.S. patent application Ser. No. 18/747,546, filed Jun. 19, 2024, and entitled “Cryogenic Tank Support System” which is incorporated herein by reference in its entirety.

BACKGROUND INFORMATION

1. Field

The present disclosure relates generally to aircraft. More specifically, the present disclosure relates to aircraft using propulsion systems powered using cleaner emission fuel alternatives, such as hydrogen, stored in fuel tanks mounted to the aircraft.

2. Background

As traditional jet fuel prices or carbon taxes rise, when combined with climate change, there is more incentive over time to use alternative fuels for powering large commercial aircraft.

One such alternative fuel is hydrogen. Hydrogen is an essentially inexhaustible resource as the most abundant source of hydrogen is water. As a fuel source, hydrogen is stored in liquid form. Liquid hydrogen fuel needs to be stored at cryogenic temperatures. In order to provide enough fuel for an aircraft to perform normally, large onboard cryogenic tanks are required for each aircraft.

The packaging of the fuel tanks, the addition of hydrogen specific systems to the aircraft, and the impacts of various safety considerations to the aircraft provide unique issues when incorporating the use of alternate fuels stored in cryogenic fuel tanks.

Issues include storage and operation of the liquid hydrogen at cryogenic temperatures and how and where to attach the cryogenic tanks to the aircraft without upsetting the flight dynamics of the aircraft and without compromising the structural integrity of the aircraft.

Therefore, it would be desirable to have a method and apparatus that takes into account at least some of the issues discussed above, as well as other possible issues.

SUMMARY

An illustrative embodiment of the present disclosure provides a system for mounting a cryogenic tank on an aircraft. The system includes a tank support system, a set of cryogenic tanks, and a fairing. The tank support system is connected to a fuselage of the aircraft. The set of cryogenic tanks is connected to the tank support system. The fairing is connected to a skin of the fuselage. The fairing also encases the tank support system and the set of cryogenic tanks.

Another illustrative embodiment of the present disclosure provides a liquid hydrogen aircraft with externally mounted cryogenic tanks. The aircraft includes a set of cryogenic tanks and a fairing. The fairing encases the set of cryogenic tanks. The fairing is also connected to the fuselage.

A further illustrative embodiment of the present disclosure provides a method for mounting a cryogenic tank on an aircraft. A tank support system is connected to a crown region of a fuselage of the aircraft. A set of cryogenic tanks is connected to the tank support system. A fairing is connected to the fuselage. The fairing encases the tank support system and the set of cryogenic tanks.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account a number of different issues with respect to aircraft that operate using alternative fuel sources such as liquid hydrogen fuel. The issues recognized by the different illustrative embodiments are described herein.

The illustrative embodiments recognize and take into account that integrating a liquid hydrogen (LH2) system into a passenger aircraft, such as a large commercial aircraft, can be challenging. For example, design challenges are present in determining where to locate the large liquid hydrogen tanks safely and how to package the thermal management and fuel tank systems, both of which have large volume requirements.

In these illustrative examples, the location of the fuel tanks with respect to the fuselage and how the tanks are attached to the fuselage is described. The liquid hydrogen tanks are positioned above the fuselage and covered in an aerodynamic fairing. The illustrative embodiments recognize and take into account that this location saves wetted area by sharing a boundary with the fuselage skin and also keeps the hydrogen outside of the fuselage compartment which protects from hydrogen entrapment.

The illustrative embodiments recognize and take into account that this type of configuration can integrate the tanks in a safe manner while keeping the added weight of the tanks and liquid hydrogen therein from affecting the flight dynamics of the aircraft and structurally isolate the tanks from the structure of the aircraft. The top-fuselage attachment location of the cryogenic tanks also protects the tanks from hard landings. In one illustrative example, four cryogenic tanks are used to add redundancy and minimize sloshing.

The illustrative embodiments recognize and take into account that a keep out zone is provided between pairs of liquid hydrogen tanks to protect against rotor burst events on aircraft with wing mounted engines. The keep out zone is aligned with the engines of the aircraft.

Figure 1:
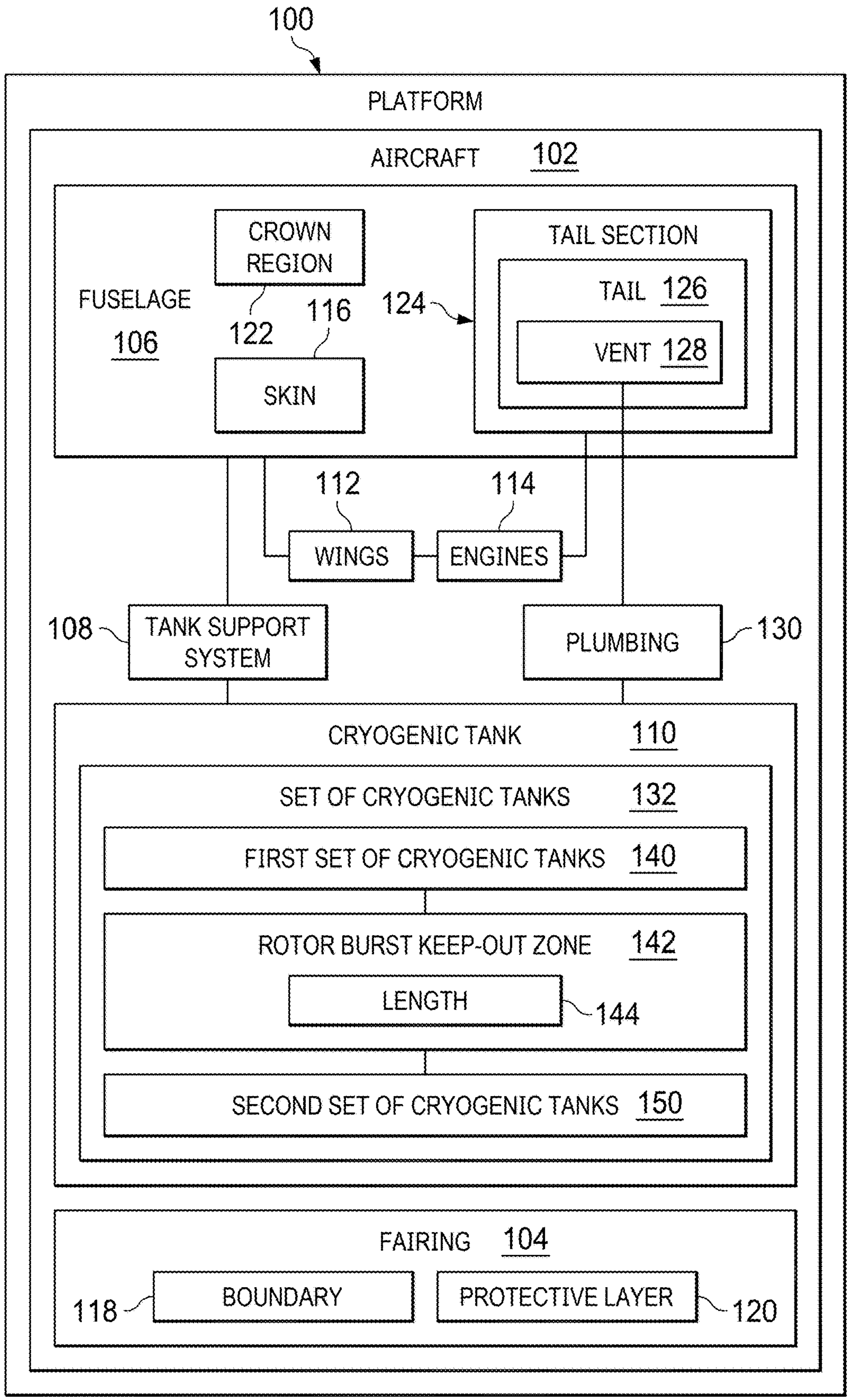
FIG. 1 is an illustration of a block diagram of a platform in accordance with an illustrative embodiment.

With reference now to the figures and, in particular, with reference to FIG. 1, an illustration of a block diagram of a platform is depicted in accordance with an illustrative example. Platform 100 has aircraft 102 in this illustrative example.

The illustration of aircraft 102 in FIG. 1 is not meant to imply physical or architectural limitations to the manner in which an illustrative example may be implemented. For example, although aircraft 102 may be a commercial aircraft, aircraft 102 may be a military aircraft, a rotorcraft, a helicopter, an unmanned aerial vehicle, or any other suitable aircraft.

Although the illustrative examples are described with respect to an aircraft, the illustrative example may be applied to other types of platforms. The platform may be, for example, a mobile platform, a stationary platform, a land-based structure, an aquatic-based structure, or a space-based structure. More specifically, the platform may be an aircraft, a surface ship, a tank, a personnel carrier, a train, a spacecraft, a space station, a satellite, a submarine, an automobile, a power plant, a bridge, a dam, a house, a manufacturing facility, a building, a tool, a mechanical structure, or some other suitable platform or structure where attachment of a cryogenic tank is desirable.

In this illustrative example, platform 100 takes the form of aircraft 102. In this illustrative example, when platform 100 takes the form of aircraft 102, aircraft 102 includes fuselage 106, tank support system 108, cryogenic tank 110, and fairing 104. Aircraft 102 further includes wings 112 and engines 114.

Tank support system 108 connects cryogenic tank 110 to fuselage 106 of aircraft 102. When tank support system 108 is used to connect cryogenic tank 110 to fuselage 106 of aircraft 102, cryogenic tank 110 is structurally isolated from aircraft 102. In other words, the connection of cryogenic tank 110 to aircraft 102 does not structurally affect fuselage 106. Tank support system 108 carries radial loads and axial loads of cryogenic tank 110 at one end of cryogenic tank 110 while only carrying radial loads of cryogenic tank 110 and allowing axial expansion of cryogenic tank 110 relative to aircraft 102 at an opposite end of cryogenic tank 110. As a result, the addition of tank support system 108 to connect cryogenic tank 110 to aircraft 102 does not compromise the structural rigidity and flexure of aircraft 102. Any forces acting on the aircraft resulting from intended use of the aircraft are isolated from the cryogenic tank and any forces acting on the cryogenic tank are isolated from the aircraft. Fairing 104 is connected to fuselage 106. Fairing 104 encases tank support system 108 and cryogenic tank 110 for aerodynamic purposes in order to keep complicated geometry out of the airflow and decrease the wetted area of aircraft 102 in use.

Fairing 104 is connected to skin 116 of fuselage 106. Fairing 104 shares boundary 118 with skin 116 of fuselage 106. Fairing 104 may also include protective layer 120. Protective layer 120 helps prevent punctures or ruptures of any kind of fairing 104. Protective layer 120, for example, may be a mesh or may be comprised of Kevlar® or aluminum. Protective layer 120 should add strength to fairing 104 without adding significant weight. Protective layer 120 can take the form of additional thickness at the forward section of fairing 104 to protect from bird strike. Protective layer 120 can take the form of additional shielding forward and aft of a rotor burst keep-out zone to protect from small fragments puncturing the fairing. Protective layer 120 can take the form of a metal mesh along the top of the fairing that helps protect the tanks from the electromagnetic effects of lighting strikes. An offset between the mesh and the tanks protects the tanks from the thermal effects.

As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

In this illustrative example, fuselage 106 includes crown region 122, skin 116, and tail section 124. Skin 116 represents the outer layer of all the structural members that form fuselage 106. Fuselage 106 includes crown region 122 located on the top of fuselage 106. Tail section 124, or empennage, is the arrangement of stabilizing surfaces at the tail of aircraft 102. Aircraft 102 also includes wings 112 and engines 114. Depending on the aircraft, engines 114 may be located on wings 112 or on tail section 124.

Tail section 124 includes tail 126. Tail 126 is a vertical stabilizing surface. Tail 126 includes vent 128. Vent 128 may be located on the top of tail 126 but may also be located at other convenient protruding locations on the aircraft such as the tip of a horizontal stabilizer of a wing. Vent 128 is connected to cryogenic tank 110 through plumbing 130. Vent 128 operates to alleviate excess tank pressure in the case that any abnormally high tank pressure is produced that poses a danger to tank integrity. Use of the vent is a failsafe in an abnormal case that should not occur in the normal operating of the aircraft and the conversion of LH2 to gaseous hydrogen (GH2) to power the engines.

Tank support system 108 is connected to fuselage 106 at crown region 122. Tank support system 108 is connected to cryogenic tank 110. Tank support system 108 structurally isolates cryogenic tank 110 from fuselage 106.

The size and capacity of cryogenic tank 110 can be designed for the intended purpose of aircraft 102. Cryogenic tank 110 may be more than one cryogenic tank, for example set of cryogenic tanks 132 may be necessary. Tank support system 108 can be configured to accommodate any number of cryogenic tanks and is not limited to a single cryogenic tank.

As used herein, a "set of," when used with reference to items, means one or more items. For example, a "set of cryogenic tanks" is one or more cryogenic tanks.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Set of cryogenic tanks 132 includes at least first set of cryogenic tanks 140 and second set of cryogenic tanks 150. The Federal Aviation Administration (FAA) requires that design precautions must be taken to minimize the hazards to the airplane in the event of an engine rotor failure. As a result, set of cryogenic tanks 132 includes rotor burst keep-out zone 142. In an illustrative example, rotor burst keep-out zone 142 may exist between first set of cryogenic tanks 140 and second set of cryogenic tanks 150. Rotor burst keep-out zone 142 creates an empty space between first set of cryogenic tanks 140 and second set of cryogenic tanks 150 along crown region 122 of aircraft 102. When engines 114 are mounted in wings 112, rotor burst keep-out zone 142 is present between first set of cryogenic tanks 140 and second set of cryogenic tanks 150 to protect first set of cryogenic tanks 140 and second set of cryogenic tanks 150 from flying pieces of engines 114 in the case of a rotor burst event.

Rotor burst keep-out zone 142 has length 144. Length 144 is the space between first set of cryogenic tanks 140 and second set of cryogenic tanks 150. The FAA defines length 144 by the practices set in the FAA's Advisory Circular AC 20-128A for a given engine geometry installed at a given location. Length 144 of rotor burst keep-out zone 142 is defined by the estimated angles for rotor fragments released from a given location during a rotor burst event.

This geometry ensures that rotor burst keep-out zone 142 is sized properly to provide sufficient protection from large and intermediate fragments for first set of cryogenic tanks 140 and second set of cryogenic tanks 150 in the case of a rotor burst event.

Cryogenic tank 110 is a double-walled, insulated tank for storing liquid hydrogen at cryogenic temperatures. Cryogenic tank 110 may be set of cryogenic tanks 132. Cryogenic tank 110 includes an inner wall separated from outer wall by a vacuum insulation layer. Cryogenic tank 110 is generally cylindrical in shape.

Tank support system 108 supports cryogenic tank 110 and connects cryogenic tank 110 to crown region 122 of fuselage 106 of aircraft 102. Tank support system 108 structurally isolates cryogenic tank 110 from fuselage 106 of aircraft 102. Tank support system 108 carries radial loads and axial loads of cryogenic tank 110 at one end of cryogenic tank 110 while only carrying radial loads of cryogenic tank 110 and allowing axial expansion of cryogenic tank 110 relative to aircraft 102 at an opposite end of cryogenic tank 110. Because axial expansion of the cryogenic tank relative to the fuselage is allowed by tank support system 108, forces acting on the aircraft are isolated from the cryogenic tank and forces acting on the cryogenic tank are isolated from the aircraft.

Figure 2:
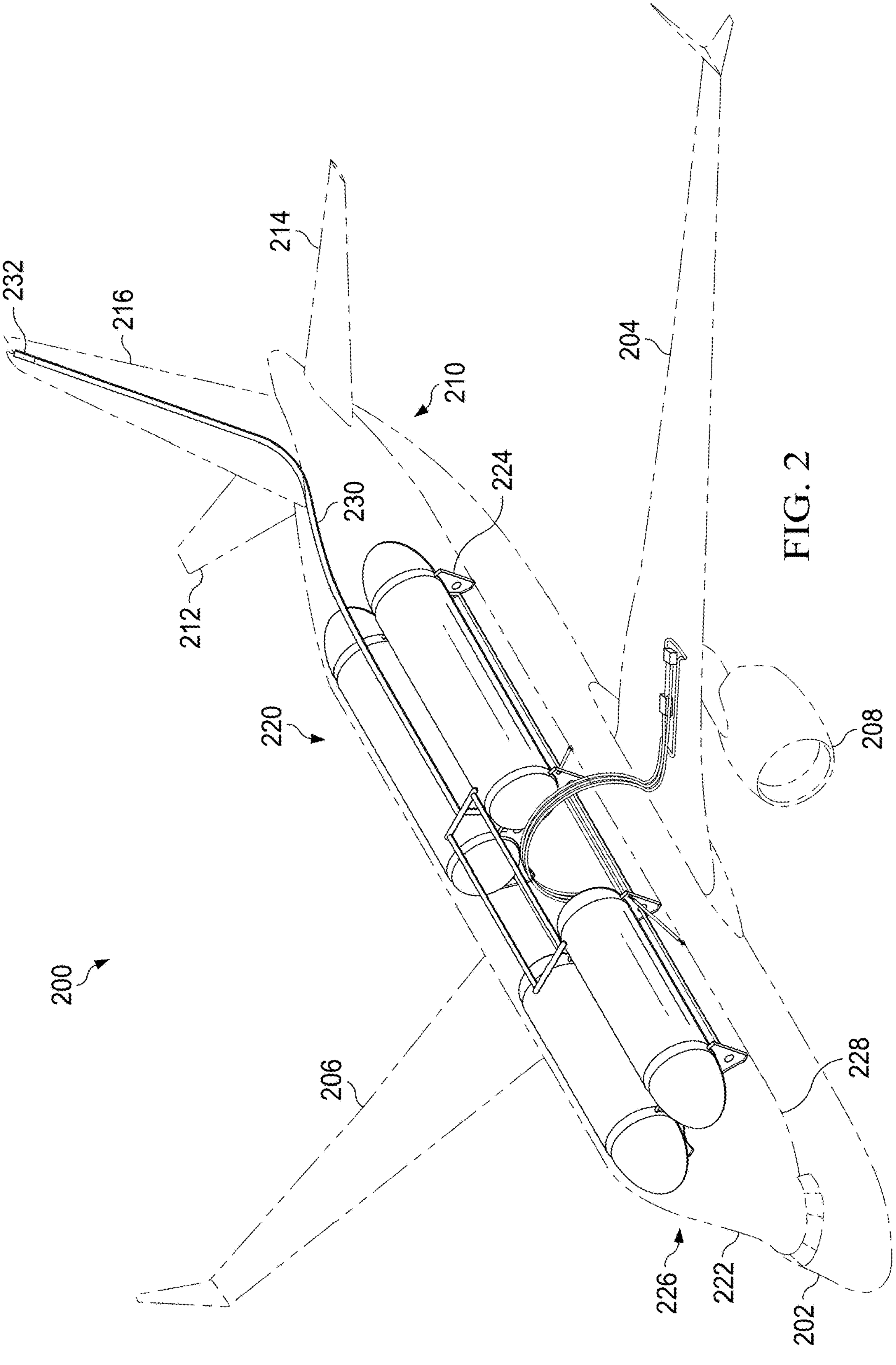
FIG. 2 is an illustration of an aircraft with a cryogenic tank in accordance with an illustrative embodiment.

With reference next to FIG. 2, an illustration of an aircraft with cryogenic tanks connected to a crown region of the fuselage with a tank support system is depicted in accordance with an illustrative embodiment. In this illustrative example and the illustrative examples that follow, the same reference numeral may be used in more than one figure. This reuse of a reference numeral in different figures represents the same element in the different figures. The components illustrated in FIG. 2 are examples of physical implementations of aircraft 102, fairing 104, fuselage 106, tank support system 108, and set of cryogenic tanks 132 shown in block form in FIG. 1.

As illustrated, aircraft 200 includes fuselage 202. Aircraft 200 has wing 204 and wing 206 connected to fuselage 202. Aircraft 200 includes engine 208 connected to wing 204. Another engine (not shown) is connected to wing 206. Fuselage 202 has tail section 210. Horizontal stabilizer 212, horizontal stabilizer 214, and tail 216 are connected to tail section 210 of fuselage 202. Each tank of set of cryogenic tanks 220 is connected to crown region 222 of fuselage 202 with tank support system 224. Tank support system 224 structurally isolates set of cryogenic tanks 220 from fuselage 202 of aircraft 200. Fairing 226 is connected to fuselage 202. Fairing 226 shares boundary 228 with the skin of fuselage 202. Fairing 226 encases tank support system 224 and set of cryogenic tanks 220 to improve aerodynamics and decrease the wetted area. Plumbing 230 connects set of cryogenic tanks 220 to vent 232. Tail 216 has an increased volume over the vertical tail of an aircraft without a set of cryogenic tanks connected to the crown region of the fuselage. The increased volume of tail 216 is necessary due to airflow interference from fairing 226.

Figure 3:
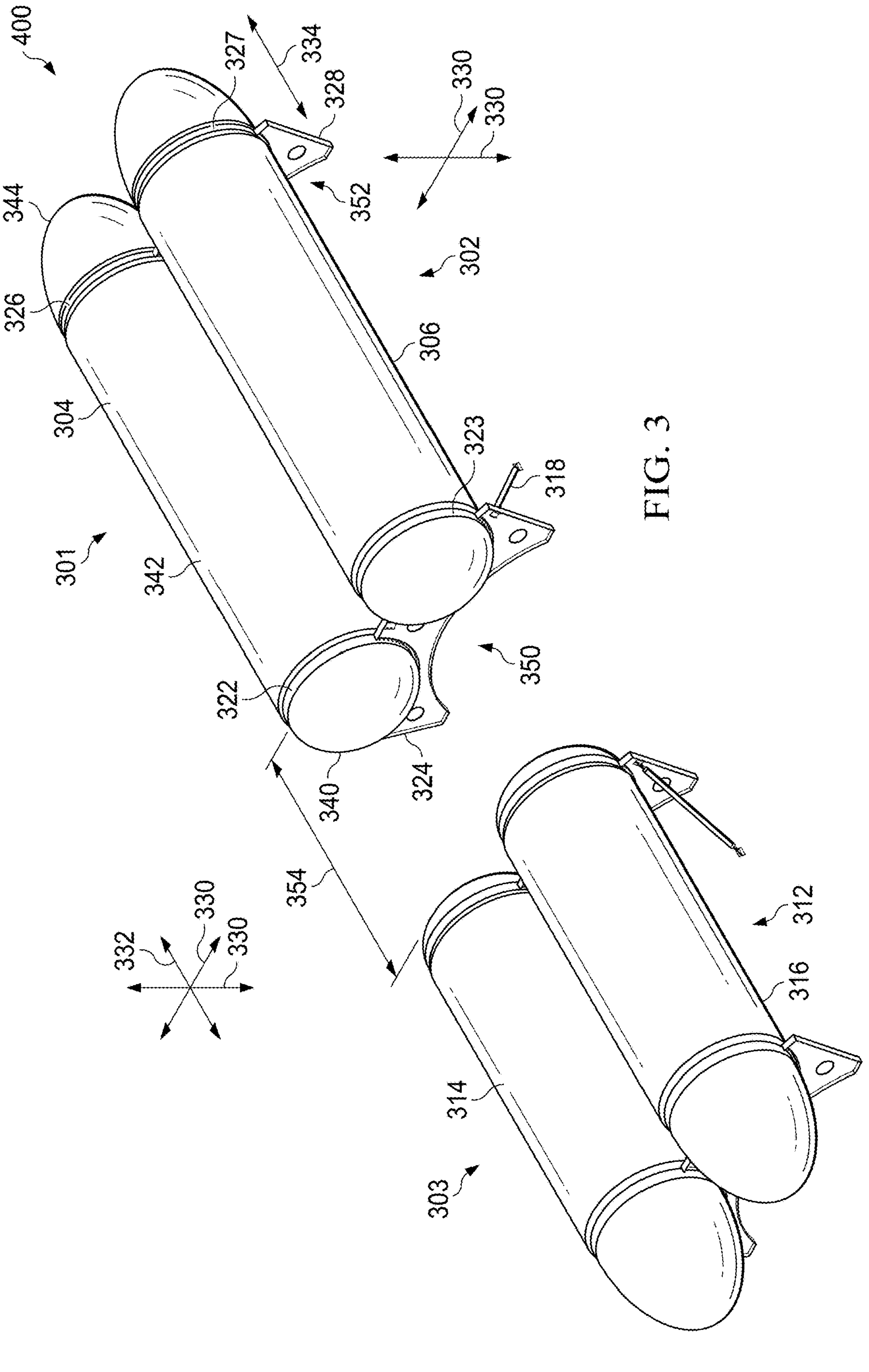
FIG. 3 is an illustration of a set of cryogenic tanks and a tank support system in accordance with an illustrative embodiment.
Figure 4:
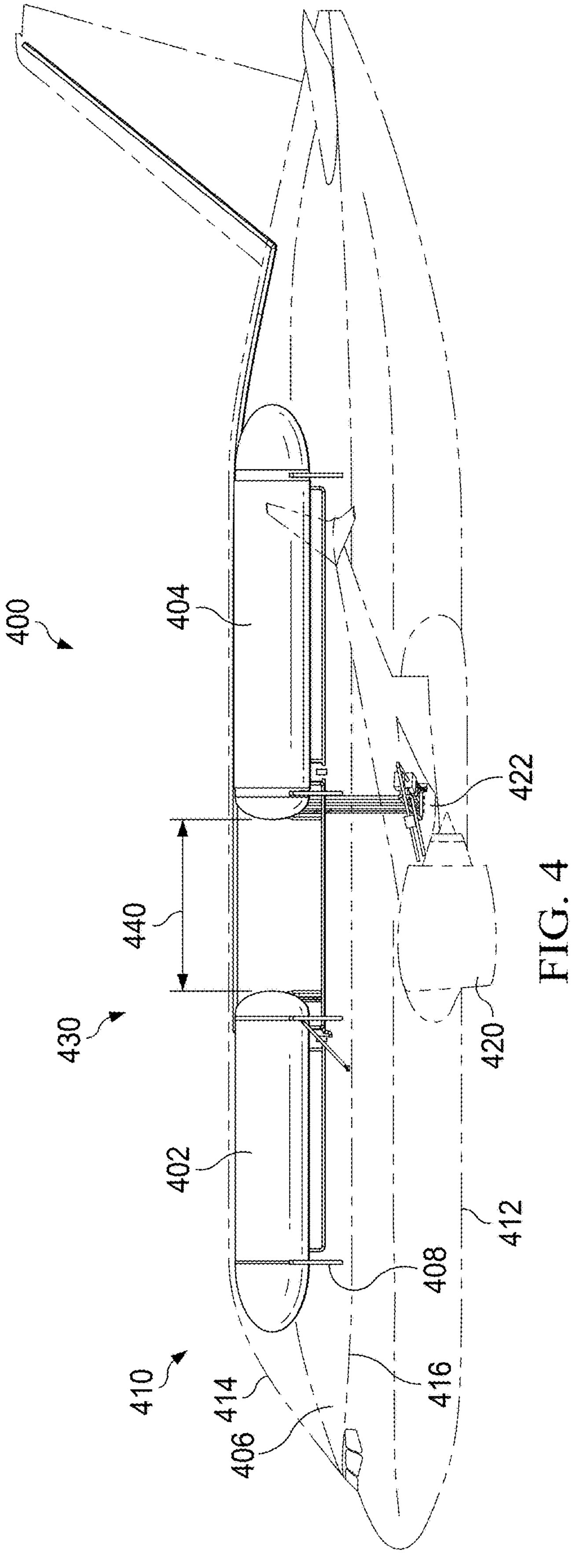
FIG. 4 is an illustration of an aircraft with a cryogenic tank in accordance with an illustrative embodiment.

With reference next to FIG. 3, an illustration of a set of cryogenic tanks connected to a tank support system in accordance with an illustrative example. The components illustrated in FIGS. 3-4 are examples of physical implementations of tank support system 108 and cryogenic tank 110 shown in block form in FIG. 1. Tank support system 302 connects first set of cryogenic tanks 301 comprising cryogenic tank 304 and cryogenic tank 306 to aircraft 308. Tank support system 312 connects second set of cryogenic tanks 303 comprising cryogenic tank 314 and cryogenic tank 316 to aircraft 308.

Tank support system 302 includes first support collar 322 and first support collar 323. First support collar 322 and first support collar 323 are each connected to first saddle bracket 324. Strut 318 is connected to first saddle bracket 324 and aircraft 308. Tank support system 302 includes second support collar 326 and second support collar 327. Second support collar 326 and second support collar 327 are each connected to second saddle bracket 328.

Tank support system 302 carries radial loads 330 and axial loads 332 of cryogenic tank 304 and cryogenic tank 306 at end 350 of tank support system 302. Tank support system 302 only carries radial loads 330 of cryogenic tank 304 and cryogenic tank 306 at end 352 of tank support system 302 while allowing axial expansion 334 of cryogenic tank 304 and cryogenic tank 306 at end 352 of tank support system 302 relative to aircraft 308. Because axial expansion of the cryogenic tank relative to the fuselage is allowed by tank support system 302, forces acting on the aircraft are isolated from the cryogenic tanks and forces acting on the cryogenic tanks are isolated from the aircraft.

Tank support system 312 has the exact same setup but in a mirrored orientation from tank support system 302. As a result, description of tank support system 312 will not be described further.

Rotor burst keep-out zone 354 is present between first set of cryogenic tanks 301 and second set of cryogenic tanks 303.

Each cryogenic tank 304, 306, 314, and 316 is a double-walled, vacuum layer insulated cryogenic tank. Each tank is comprised of an inner wall spaced from an outer wall by a vacuum insulation layer. Each cryogenic tank is comprised of three sections, for example, cryogenic tank 304 includes end dome 340 connected to cylindrical body 342 connected to nose dome 344. End dome 340 is connected to cylindrical body 342 by, for example, first support collar 322. Cylindrical body 342 is connected to nose dome 344 by, for example, second support collar 326.

The inner ring of the support collar is connected to the inner wall of the cryogenic tank. The inner ring is either welded or co-bonded directly to the inner wall of the cryogenic tank to avoid tank penetration with standard mechanical fasteners. The outer ring of the support collar is connected to the outer wall of the cryogenic tank. As a result, not only does the tank support system connect the cryogenic tanks to fuselage of aircraft, in this illustrative example, first support collar 322 and second support collar 326 support the inner wall of cryogenic tank 304 within the outer wall of cryogenic tank 304. In other words, the support collars keep the outer wall of the cryogenic tank spaced from the inner wall of the cryogenic tank. As a result, a vacuum insulation layer between the inner wall and the outer wall remains uncompromised and provides a cryogenic temperature insulation layer.

Figure 5:
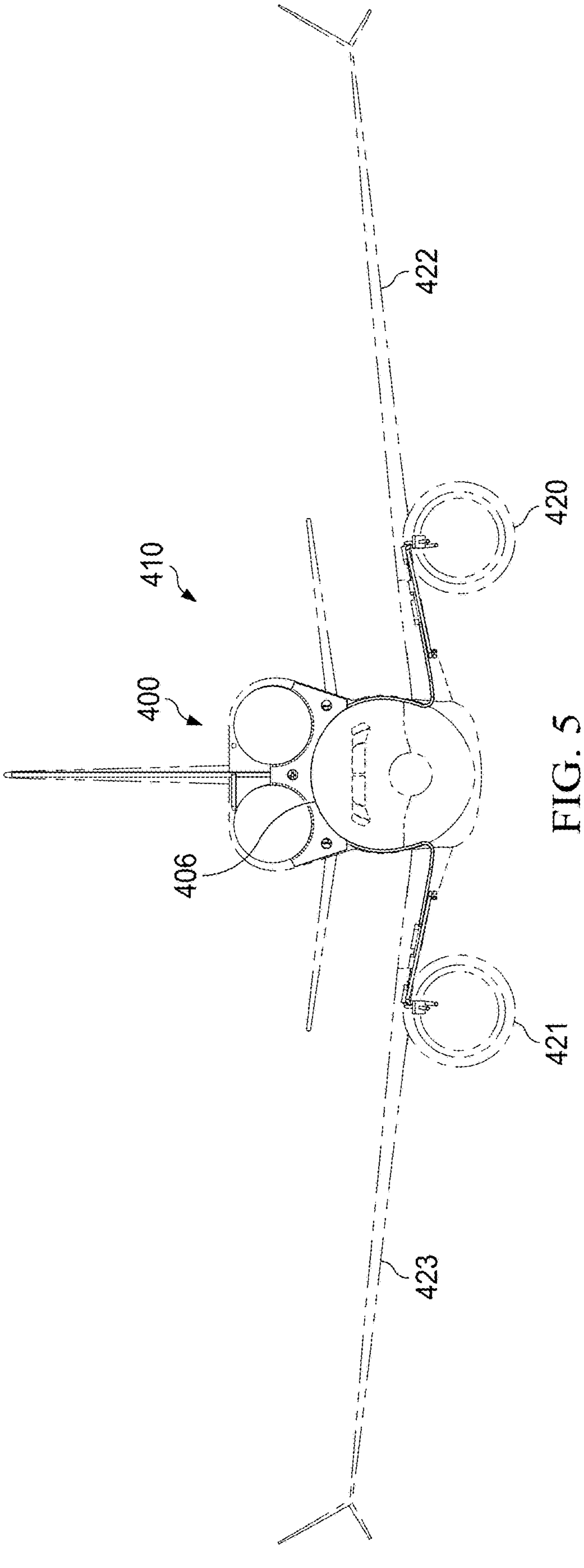
FIG. 5 is an illustration of an aircraft with a cryogenic tank in accordance with an illustrative embodiment.

With reference next to FIGS. 4-5, illustrations of an aircraft with a cryogenic tank attached to the crown region of the fuselage is depicted in accordance with an illustrative embodiment. The components illustrated in FIGS. 4-5 are examples of physical implementations of set of cryogenic tanks 132 shown in block form in FIG. 1.

Set of cryogenic tanks 400 is connected to crown region 406 of fuselage 412 of aircraft 410 with tank support system 408. Tank support system 408 is connected to crown region 406. Tank support system is connected to set of cryogenic tanks 400. Aircraft 410 includes engines 420 and 421 mounted to wings 422 and 423.

Set of cryogenic tanks 400 includes first set of cryogenic tanks 402 and second set of cryogenic tanks 404. Rotor burst keep-out zone 430 exists between first set of cryogenic tanks 402 and second set of cryogenic tanks 404. Rotor burst keep-out zone 430 creates empty space between first set of cryogenic tanks 402 and second set of cryogenic tanks 404 along crown region 406 of aircraft 410. Rotor burst keep-out zone 430 is present to protect first set of cryogenic tanks 402 and second set of cryogenic tanks 404 from flying pieces of engine in the case of a rotor burst event. During a rotor burst event, it is possible that pieces of the engines' turbomachinery may have sufficient energy to pierce through the cryogenic tanks. As a result, the best protection for the tanks from this possible exposure is to locate the tanks elsewhere, for example, out of a keep-out zone. Rotor burst keep-out zone 430 is aligned with engines 420 and 421.

Rotor burst keep-out zone 430 has length 440. Length 440 is the space between first set of cryogenic tanks 402 and second set of cryogenic tanks 404. Length 440 is defined by the FAA for a given engine geometry installed at a given location. Length 440 of rotor burst keep-out zone 430 is defined by the estimated angles for rotor fragments released from a given location during a rotor burst event. This geometry, regulated by the FAA, ensures that rotor burst keep-out zone 430 is sized properly to provide sufficient protection for first set of cryogenic tanks 402 and second set of cryogenic tanks 404 in the case of a rotor burst event.

Fairing 414 is connected to fuselage 412 of aircraft 410. Fairing 414 shares boundary 416 with the skin of fuselage 412. Fairing 414 encases tank support system 408 and set of cryogenic tanks 400.

Figure 6:
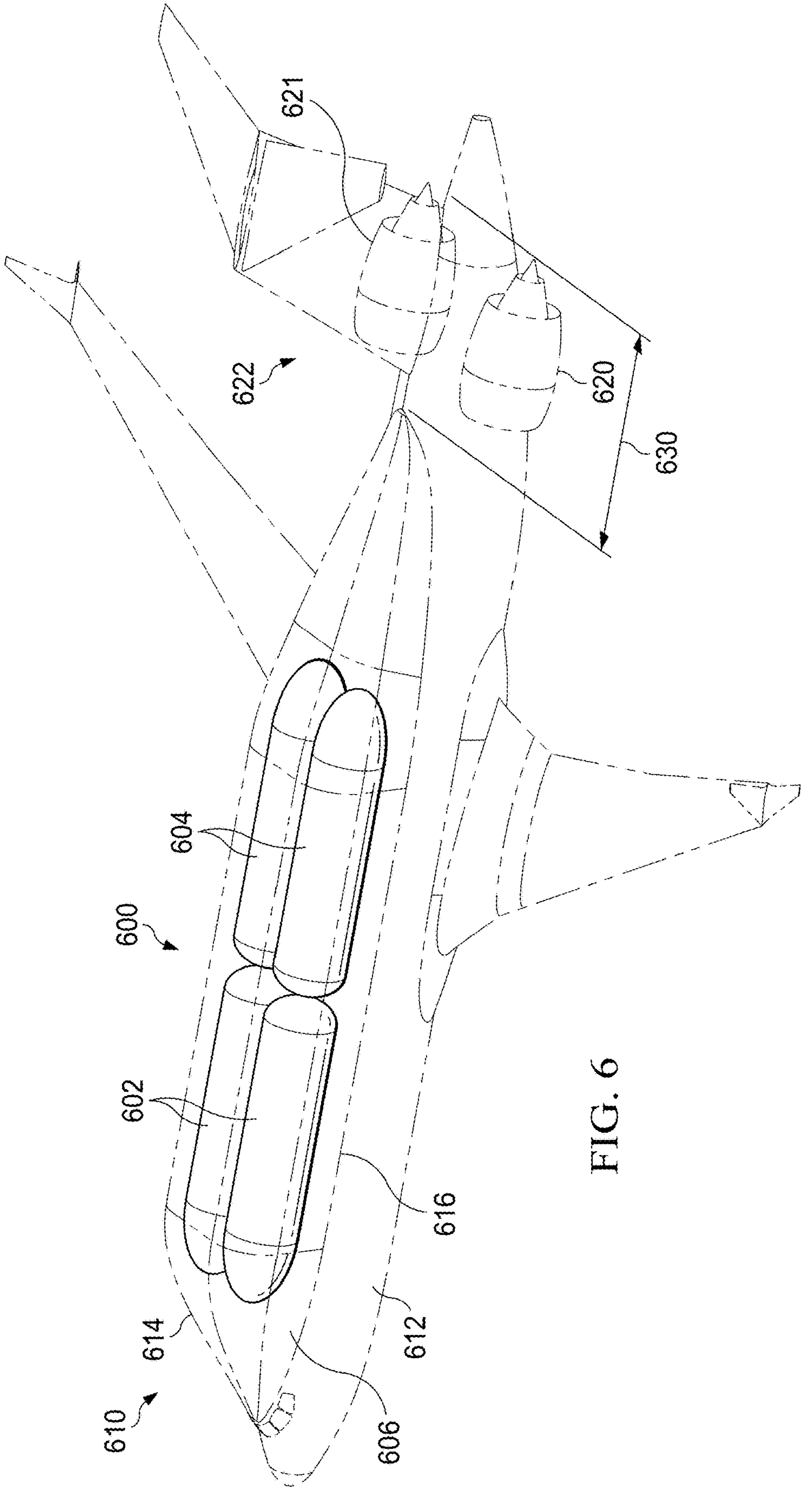
FIG. 6 is an illustration of an aircraft with a cryogenic tank in accordance with an illustrative embodiment.
Figure 7:
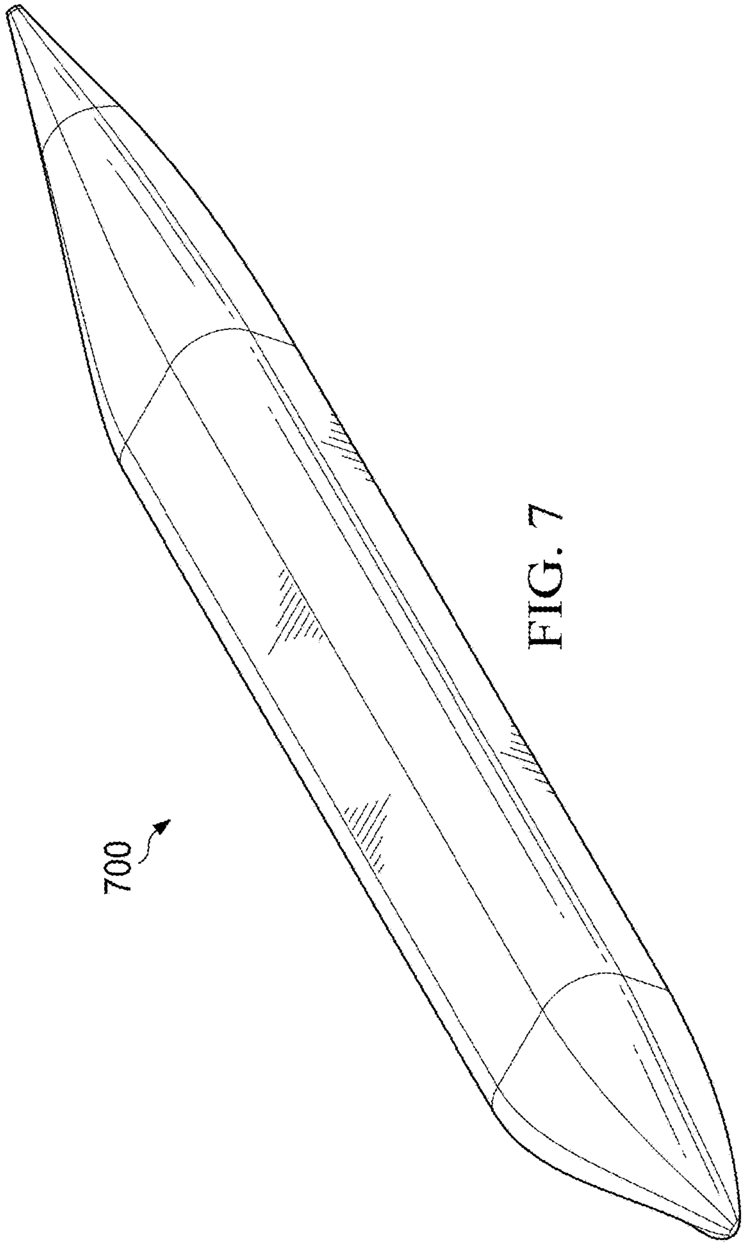
FIG. 7 is an illustration of a perspective view of a fairing in accordance with an illustrative embodiment.
Figure 8:
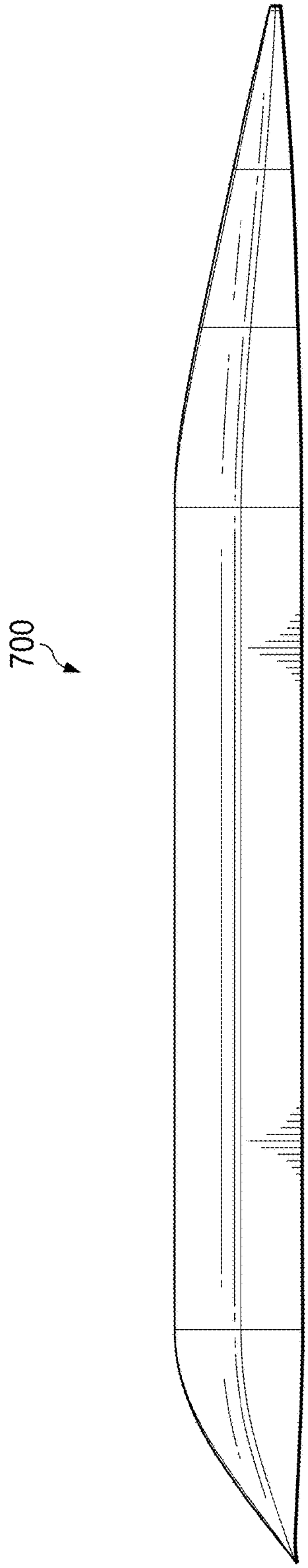
FIG. 8 is an illustration of a side elevation view of a fairing in accordance with an illustrative embodiment.
Figure 9:
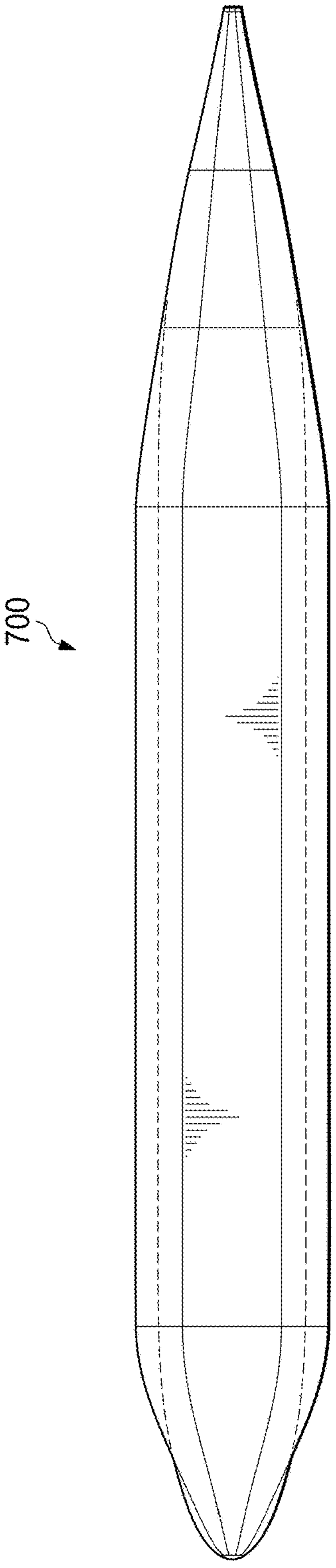
FIG. 9 is an illustration of a top plan view of a fairing in accordance with an illustrative embodiment.
Figure 10:
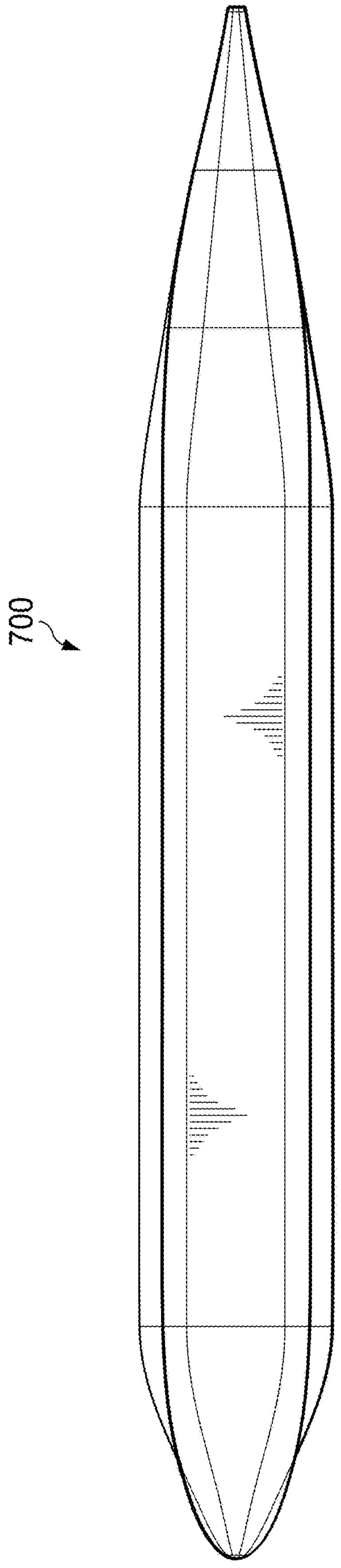
FIG. 10 is an illustration of a bottom plan view of a fairing in accordance with an illustrative embodiment.
Figure 11:
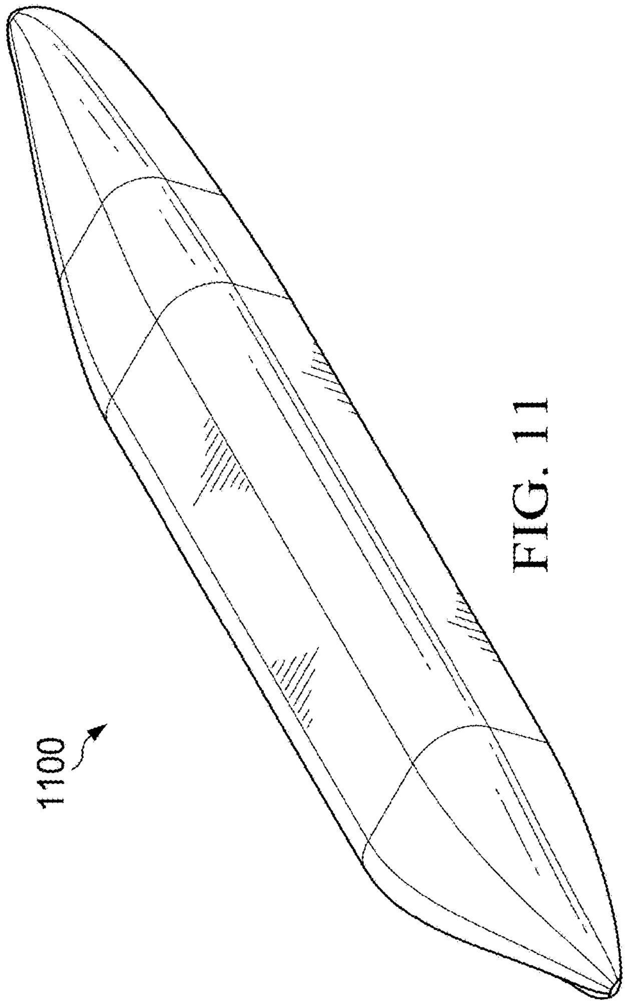
FIG. 11 is an illustration of a perspective view of a fairing in accordance with an illustrative embodiment.
Figure 12:
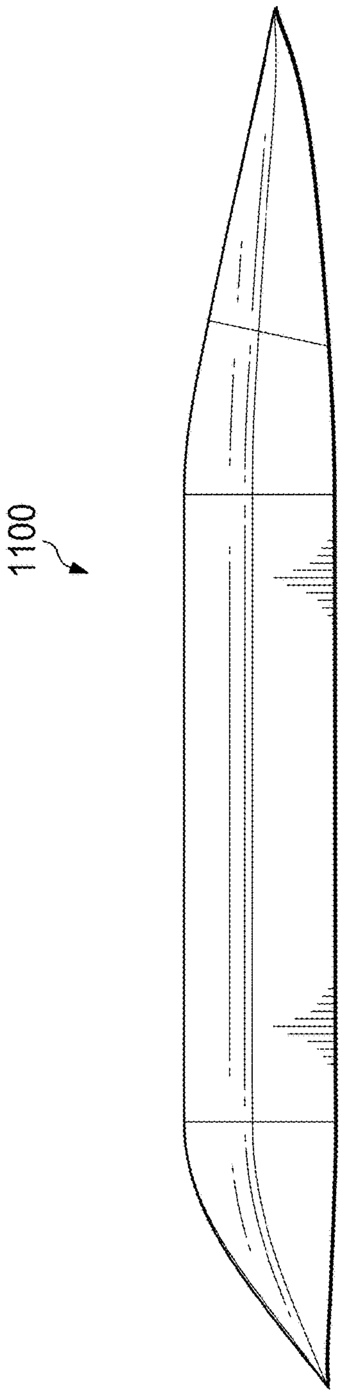
FIG. 12 is an illustration of a side elevation view of a fairing in accordance with an illustrative embodiment.
Figure 13:
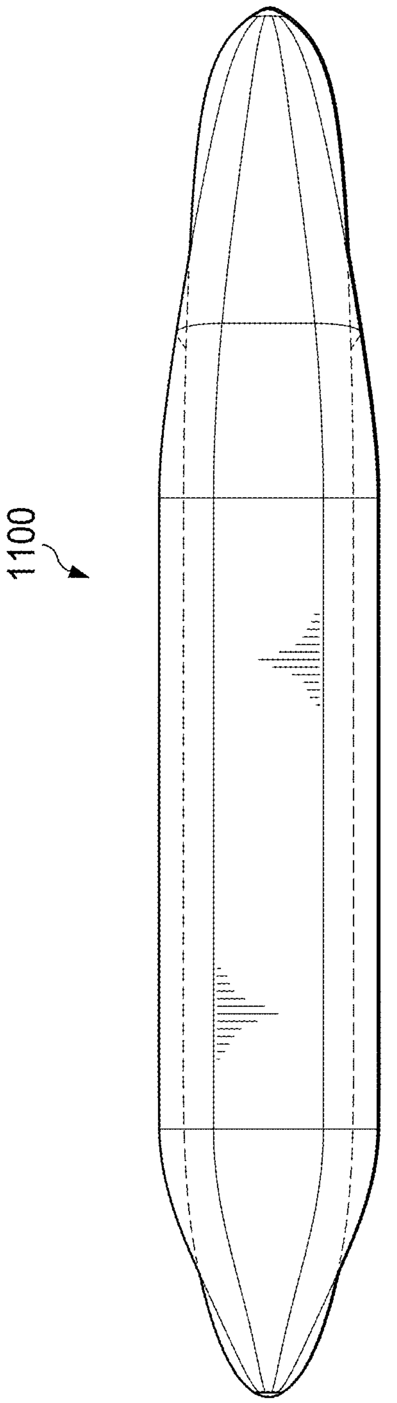
FIG. 13 is an illustration of a top plan view of a fairing in accordance with an illustrative embodiment.
Figure 14:
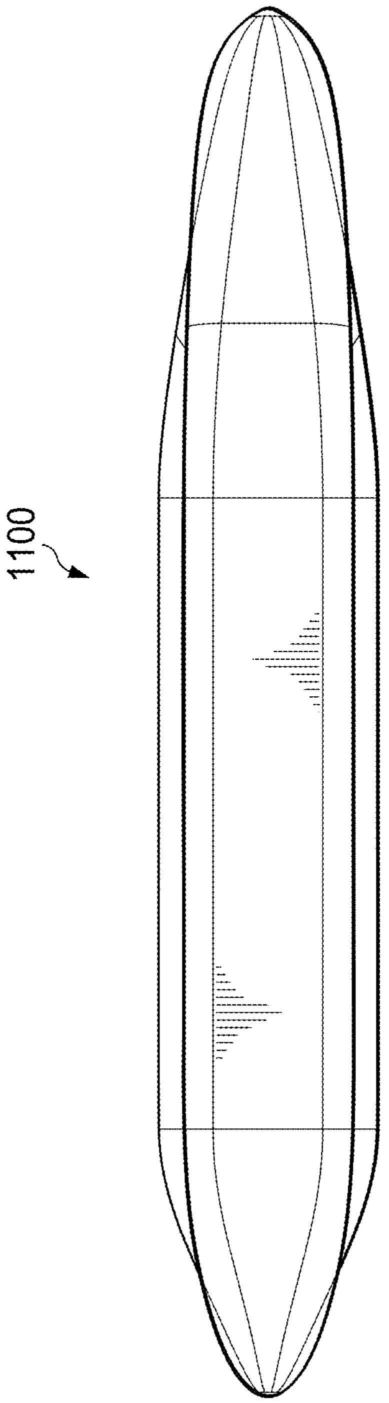
FIG. 14 is an illustration of a bottom plan view of a fairing in accordance with an illustrative embodiment.

With reference next to FIG. 6, an illustration of an aircraft with a cryogenic tank attached to the crown region of the fuselage is depicted in accordance with an illustrative embodiment. The components illustrated in FIG. 6 are examples of physical implementations of set of cryogenic tanks 132 shown in block form in FIG. 1.

Set of cryogenic tanks 600 is connected to crown region 606 of fuselage 612 of aircraft 610 with a tank support system. Aircraft 610 includes engines 620 and 621 mounted to tail section 622 of aircraft 610.

Set of cryogenic tanks 600 includes first set of cryogenic tanks 602 and second set of cryogenic tanks 604. In contrast to set of cryogenic tanks 400 depicted in FIG. 4, no significant gap exists between first set of cryogenic tanks 602 and second set of cryogenic tanks 604. However, rotor burst keep-out zone 630 for the engines still exists. Rotor burst keep-out zone 630 is aligned with engines 620 and 621. Rotor burst keep-out zone 630 creates empty space over engines 620 and 621 along crown region 606 of aircraft 610. Rotor burst keep-out zone 630 is present to protect first set of cryogenic tanks 602 and second set of cryogenic tanks 604 from flying pieces of engine in the case of a rotor burst event.

Fairing 614 is connected to fuselage 612 of aircraft 610. Fairing 614 shares boundary 616 with the skin of fuselage 612. Fairing 614 encases set of cryogenic tanks 600 and a tank support system that connects set of cryogenic tanks 600 to the crown region of fuselage 612.

With reference next to FIGS. 7-10, illustrations of a fairing for encasing a cryogenic tank and a tank support system attached to the crown region of a fuselage of an aircraft is depicted in accordance with an illustrative embodiment. The components illustrated in FIGS. 7-10 are examples of physical implementations of set of fairing 104 shown in block form in FIG. 1. In this illustrative example, the engines of the aircraft are located on the wings of the aircraft extending from the fuselage.

With reference next to FIGS. 11-14, illustrations of a fairing for encasing a cryogenic tank and a tank support system attached to the crown region of the fuselage is depicted in accordance with an illustrative embodiment. The components illustrated in FIGS. 11-14 are examples of physical implementations of set of fairing 104 shown in block form in FIG. 1. In this illustrative example, the engines of the aircraft are located on the tail section of the aircraft.

Figure 15:
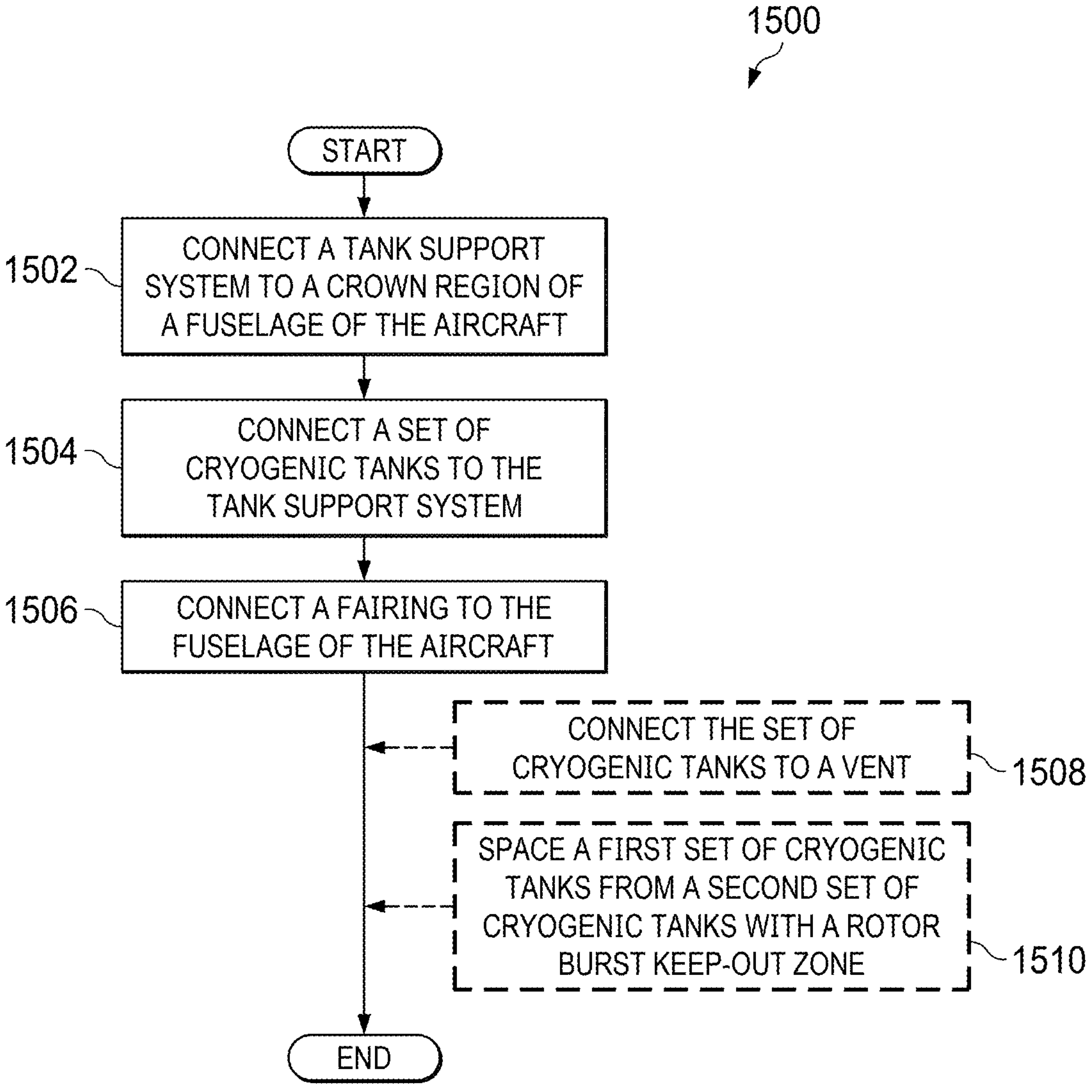
FIG. 15 is an illustration of a flowchart of a process for installing a cryogenic tank on an aircraft in accordance with an illustrative embodiment.

With reference next to FIG. 15, an illustration of a flowchart of a process 1500 for mounting a cryogenic tank on an aircraft is depicted in accordance with an illustrative embodiment. The method depicted in FIG. 15 may be used in conjunction with the tank support system, the cryogenic tank, and the fairing depicted in FIGS. 1-14.

The process begins by connecting a tank support system to a crown region of a fuselage of the aircraft (operation 1502). The process continues by connecting a set of cryogenic tanks to the tank support system (operation 1504). At operation 1506, the process connects a fairing to the fuselage of the aircraft. The fairing encases the tank support system and the set of cryogenic tanks. At operation 1508, the process connects the set of cryogenic tanks to a vent with tubing. In this example, the vent is located in a vertical tail of the aircraft, however, the vent could be located at other protruding locations such as the tip of a horizontal stabilizer or a wing. At operation 1510, the set of cryogenic tanks comprises a first set of cryogenic tanks and a second set of cryogenic tanks. The process spaces the first set of cryogenic tanks from the second set of cryogenic tanks with a rotor burst keep-out zone. The rotor burst keep-out zone is aligned with engines mounted to wings of the aircraft.

In some alternative implementations of an illustrative example, the function or functions noted in the blocks may not be necessary or may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 16:
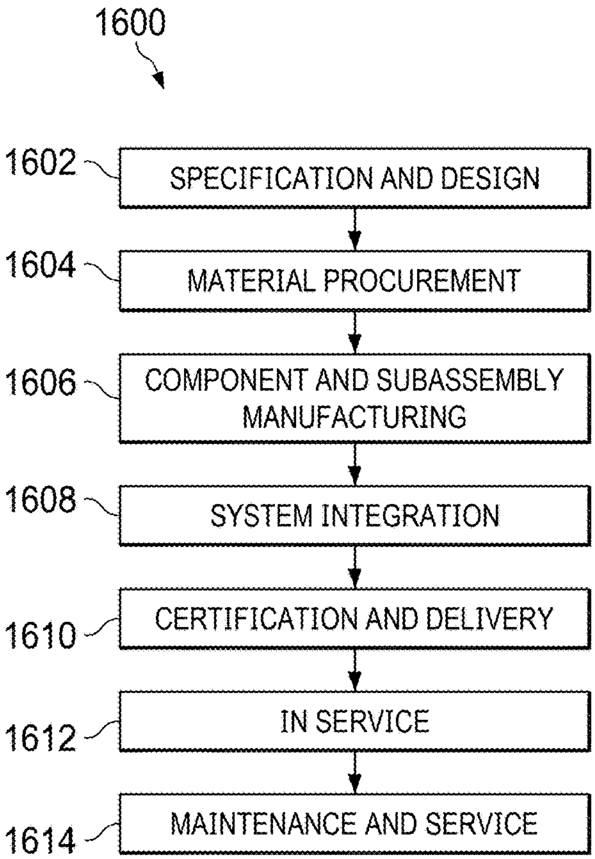
FIG. 16 is an illustration of an aircraft manufacturing and service method in accordance with an illustrative embodiment.
Figure 17:
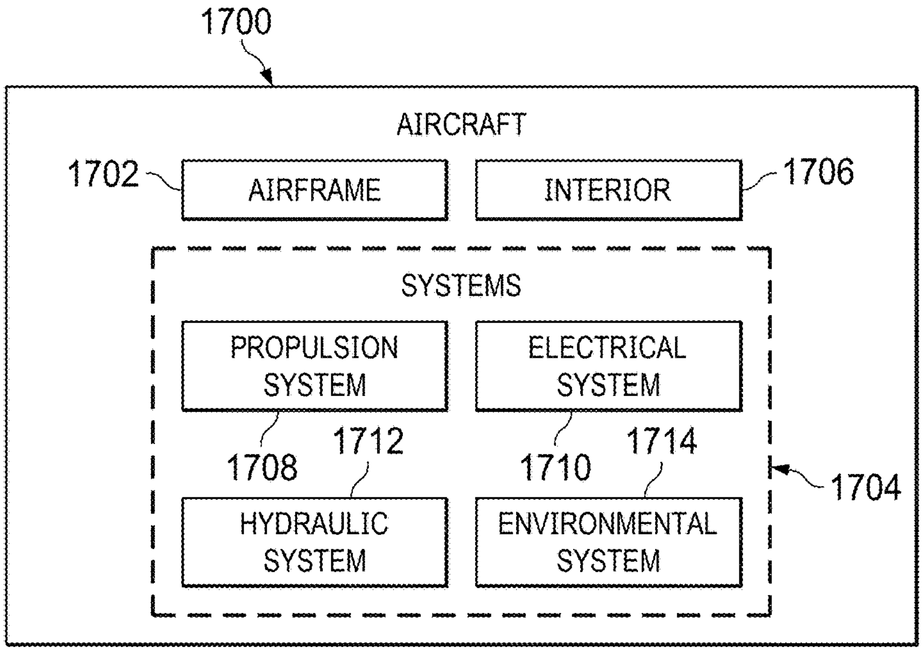
FIG. 17 is an illustration of a block diagram of an aircraft in which an illustrative embodiment may be implemented.

The illustrative embodiments of the disclosure may be further described in the context of aircraft manufacturing and service method 1600 as shown in FIG. 16 and aircraft 1700 as shown in FIG. 17. Turning first to FIG. 16, an illustration of a block diagram of an aircraft manufacturing and service method is depicted in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance, service, or inspection.

The apparatus of this disclosure may be installed on an aircraft during component and subassembly manufacturing 1606. In addition, the apparatus of this disclosure may be retrofitted onto aircraft 1700 in FIG. 17 during routine maintenance and service 1614 as part of a modification, reconfiguration, or refurbishment of aircraft 1700 in FIG. 17.

Each of the processes of aircraft manufacturing and service method 1600 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 17, an illustration of a block diagram of an aircraft is depicted in which an illustrative embodiment may be implemented. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16. In one illustrative example, components or subassemblies produced in component and subassembly manufacturing 1606 in FIG. 16 may be fabricated or manufactured in a manner similar to components or subassemblies produced while aircraft 1700 is in service 1612 in FIG. 16. As yet another example, one or more apparatus embodiments, method embodiments, or a combination thereof may be utilized during production stages, such as component and subassembly manufacturing 1606 and system integration 1608 in FIG. 16. One or more apparatus embodiments, method embodiments, or a combination thereof may be utilized while aircraft 1700 is in service 1612, during maintenance and service 1614, inclusive of inspection, in FIG. 16, or both. The use of a number of the different illustrative embodiments may substantially expedite the assembly of aircraft 1700, reduce the cost of aircraft 1700, or both expedite the assembly of aircraft 1700 and reduce the cost of aircraft 1700.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system configured to mount a cryogenic tank to an aircraft that comprises:

a tank support system connected on a crown region of a fuselage of the aircraft;

a set of cryogenic tanks connected to the tank support system, wherein each cryogenic tank comprises, respectively an end dome connected to a cylindrical body by a first support collar connected to a second cryogenic tank and a nose dome connected to the cylindrical body by a second support collar connected to the second cryogenic tank; and a fairing encasing the tank support system and the set of cryogenic tanks, wherein the fairing connects to and shares a boundary with a skin of the fuselage and comprises a length that aligns parallel to a length of the fuselage;

wherein the set of cryogenic tanks comprises a first set of cryogenic tanks and a second set of cryogenic tanks, further comprising a rotor burst keep-out zone between the first set of cryogenic tanks and the second set of cryogenic tanks, wherein the rotor burst keep-out zone is aligned with engines mounted to wings of the aircraft.

2. The system of claim 1, wherein the first support collar and the second support collar are configured to connect to the crown region of the fuselage.

3. The system of claim 1, wherein a length of the rotor burst keep-out zone is defined by estimated angles for rotor fragments released from a given location during a rotor burst event.

4. The system of claim 1, further comprising plumbing connected to the set of cryogenic tanks and leading to a vent located in a top of a vertical tail of the aircraft.

5. The system of claim 1, wherein a vertical tail of the aircraft includes a vent connected to the set of cryogenic tanks and wherein a volume of the vertical tail is greater than a volume of a vertical tail designed for the aircraft without the fairing.

6. The system of claim 1, wherein the set of cryogenic tanks comprises four individual cryogenic tanks connected to a crown region of the fuselage by the tank support system.

7. The system of claim 1, wherein the tank support system and the set of cryogenic tanks are connected to a crown region of the fuselage, wherein the set of cryogenic tanks comprises a first set of cryogenic tanks and a second set of cryogenic tanks, and wherein a rotor burst keep-out zone aligned with engines mounted to wings of the aircraft exists between the first set of cryogenic tanks and the second set of cryogenic tanks.

8. A liquid hydrogen aircraft that comprises:

a set of cryogenic tanks connected on a crown region of a fuselage of the aircraft, wherein each cryogenic tank comprises, respectively an end dome connected to a cylindrical body by a first support collar connected to a second cryogenic tank and a nose dome connected to the cylindrical body by a second support collar connected to the second cryogenic tank; and a fairing that encases the set of cryogenic tanks, connects to the fuselage, and comprises a rotor burst keep-out zone between the first set of cryogenic tanks and the second set of cryogenic tanks, wherein the rotor burst keep-out zone is aligned with engines mounted to wings of the aircraft.

9. The aircraft of claim 8, further comprising:

a tank support system that comprises the first support collar and the second support collar are configured to connect to the fuselage and the set of cryogenic tanks, wherein the tank support system is encased within the fairing, wherein the fairing comprises a length that aligns parallel to a length of the fuselage.

10. The aircraft of claim 8, wherein a length of the rotor burst keep-out zone is defined by estimated angles for rotor fragments released from a given location during a rotor burst event.

11. The aircraft of claim 8, further comprising plumbing connected to the set of cryogenic tanks and leading to a vent located in a top of a vertical tail of the aircraft.

12. The aircraft of claim 8, wherein a vertical tail of the aircraft includes a vent connected to the set of cryogenic tanks and wherein a volume of the vertical tail is greater than a volume of a vertical tail designed for the aircraft without the fairing.

13. The aircraft of claim 8, wherein the set of cryogenic tanks comprises four individual cryogenic tanks connected to the crown region of the fuselage by a tank support system and wherein the tank support system provides structural isolation between the set of cryogenic tanks and the fuselage of the aircraft.

14. A method for mounting a cryogenic tank on an aircraft, the method comprising:

connecting a tank support system on a crown region of a fuselage of the aircraft;

connecting a set of cryogenic tanks to the tank support system, wherein each cryogenic tank comprises, respectively an end dome connected to a cylindrical body by a first support collar connected to a second cryogenic tank and a nose dome connected to the cylindrical body by a second support collar connected to the second cryogenic tank; and connecting a fairing to the fuselage of the aircraft, wherein the fairing encases the tank support system and the set of cryogenic tanks and comprises a length that aligns parallel to a length of the fuselage;

wherein the set of cryogenic tanks comprises a first set of cryogenic tanks and a second set of cryogenic tanks and further comprising:

spacing the first set of cryogenic tanks from the second set of cryogenic tanks with a rotor burst keep-out zone, wherein the rotor burst keep-out zone is aligned with engines mounted to wings of the aircraft.

15. The method of claim 14, wherein each cryogenic tank comprises, respectively an end dome connected to a cylindrical body by a first support collar connected to a second cryogenic tank and a nose dome connected to the cylindrical body by a second support collar connected to the second cryogenic tank, and further comprising:

connecting the set of cryogenic tanks to a vent with plumbing; and locating the vent in a vertical tail of the aircraft.

16. The system of claim 1, wherein the engines are mounted under the wings.

17. The system of claim 1, wherein the first set of cryogenic tanks and the second set of cryogenic tanks each comprise two tanks.

18. The system of claim 1, wherein each cryogenic tank in the set of cryogenic tanks is narrower at an end of the each cryogenic tank than it is at its center.

19. The method of claim 14, wherein the first set of cryogenic tanks and the second set of cryogenic tanks each comprise two tanks.

20. The method of claim 14, wherein the engines are mounted under the wings.

* * * * *